June 11, 1935.          L. Q. MOFFITT          2,004,506
RESILIENT SHAFT JOURNAL AND BEARING THEREFOR
Filed March 6, 1934
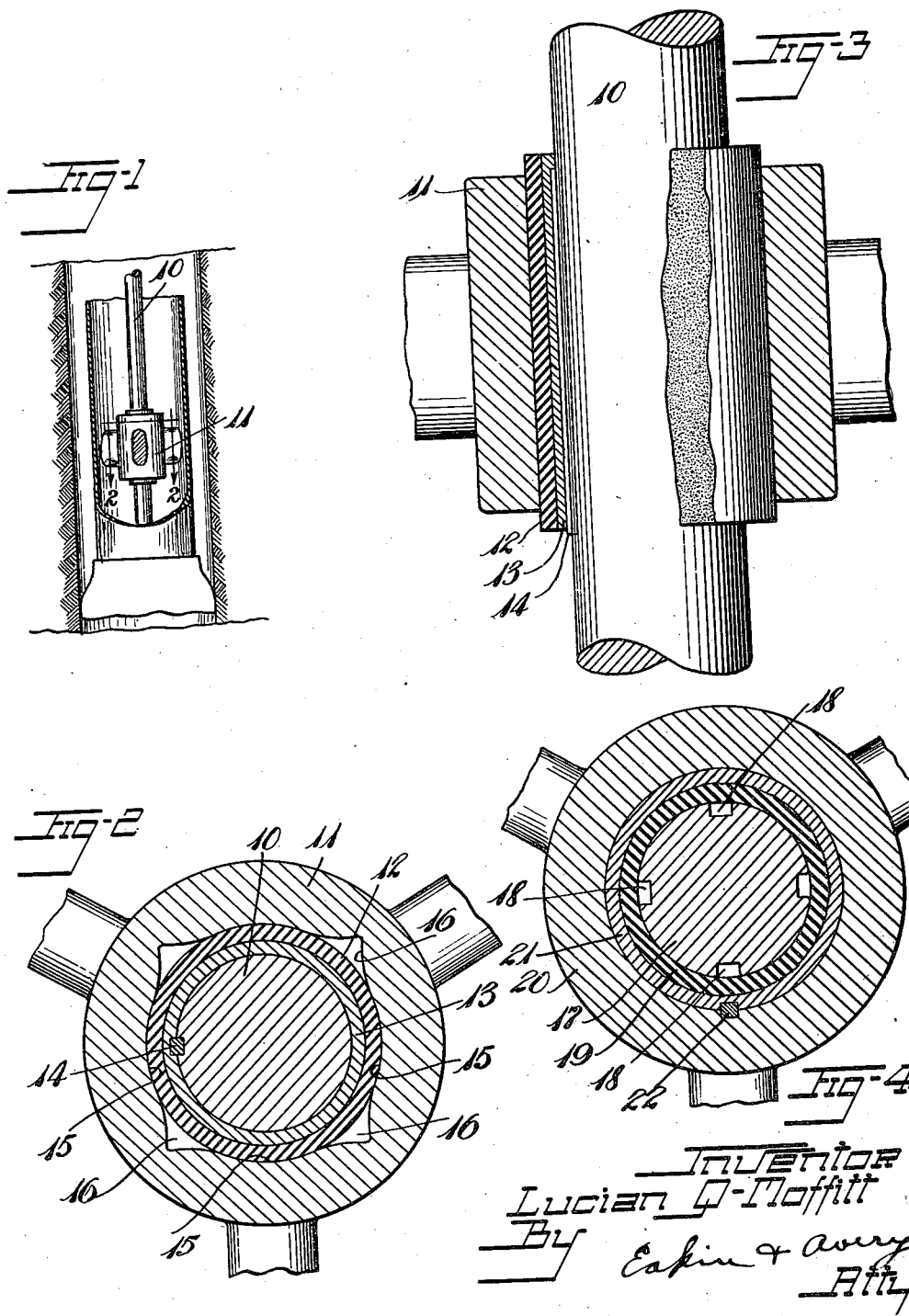

Patented June 11, 1935

2,004,506

UNITED STATES PATENT OFFICE 2,004,506

RESILIENT SHAFT JOURNAL AND BEARING THEREFOR

Lucian Q. Moffitt, Akron, Ohio, assignor to The B. F. Goodrich Company, New York, N. Y., a corporation of New York Application March 6, 1934, Serial No. 714,236

14 Claims. (Cl. 308—238)

This invention relates to resilient rubber bearings of the water lubricated type and especially to resilient shaft journals and rigid bearings therefor.

It has been found, where rotating shafts must be supported under water as in hydraulic turbines, deep well pumps, and the propeller shaft bearings of ships, that superior results are obtained by the use of resilient rubber for one of the bearing surfaces and non-corrodible metal for the other surface. In the construction of such bearings it has been customary to provide a metallic bearing surface having an uninterrupted face and to form the rubber surface with a face interrupted by lubricant grooves.

While it is known that such a combination of bearing surfaces, when so constructed as to provide proper water lubrication, excels other bearings in resistance to wear, scoring and wear of the metallic bearing surface occasionally occurs because of the embedding of pieces of hard foreign material in the rubber bearing surface.

While it has been proposed in some cases to use rubber as the journal and metal as the bearing therefor, such suggestions have always contemplated the use of a continuous metal bearing surface.

The principal objects of this invention are to avoid scoring of the metal surface, to provide increased resistance to wear of the bearing, to facilitate dislodgment of foreign material from the rubber surface, and generally to provide economy and efficiency of operation.

Other objects will appear from the following description and the accompanying drawing.

Of the drawing:

Fig. 1 is a view showing a preferred form of the invention as installed in a well-pump of the rotary type, the well being shown in section and the enclosing parts of the pump structure being broken away to show the bearing.

Fig. 2 is a cross-section of the journal, shaft, and bearing taken on line 2—2 of Fig. 1, drawn to an enlarged scale.

Fig. 3 is a side view of the bearing and journal, also drawn to a larger scale, and partly broken away and in section, to show its construction.

Fig. 4 is a view similar to Fig. 2 but showing a modified form of the device.

Referring to the drawing:

In the preferred form shown in Figs. 1 to 3, the numeral 10 designates a rotatable shaft which, in the example chosen for illustration in Figs. 1 to 3, is mounted vertically to rotate in bearings such as that designated by the numeral 11.

The journal member comprises a smooth surfaced resilient soft rubber sleeve 12 which may be vulcanized, or otherwise fastened, to the shaft. A convenient construction, which permits the manufacture of the journal before its application to the shaft, is made possible by vulcanizing the rubber to a supporting metal sleeve 13, which may be slipped over the shaft and held in place by a key 14, or in any other suitable manner.

In order to provide ample flow of water or other lubricant over the journal, and to facilitate early removal of embedded foreign particles, the rigid bearing is formed to provide spaced arcuate bearing lands 15 with longitudinal grooves 16 therebetween. The grooves are preferably, but not necessarily, formed of such cross-section as to provide an acute threshold angle at the margins of the arcuate lands to increase the capillary force and to induce wiping of the fluid over the bearing surfaces.

In the form illustrated in Fig. 4, the rotatable member is a rigid metallic shaft 17 having its bearing surface interrupted by longitudinally disposed lubricant grooves 18. The rigid shaft 17 is journaled in a smooth face uninterrupted rubber bearing 19. The bearing 19 may be attached directly to its supporting member 20 but it is preferred to vulcanize the rubber to a removable rigid sleeve 21 which may be held in place by a key 22 or other fastening device for ready replacement.

In any of the forms which the invention may assume, the rigid bearing surface, whether it be the rotatable or the stationary member, has an interrupted surface whereas the resilient surface is preferably continuous. Should a particle of foreign matter enter between the bearing surfaces, the resilient surface will become depressed, by deformation of the rubber, where it contacts with the particle, causing the resilient material adjacent the particle to be placed under tension. When the tensioned portion is so uncovered, by relative rotation of the parts, that the tensioned portion aligns with a lubricant groove in the rigid surface, the resilient surface recovers its original shape, by release of tension, and the particle is thrown into the lubricant stream and is washed from the bearing.

I claim:

1. The combination of a shaft member and a bearing member therefor, one of said members having a rigid bearing surface interrupted by lubricant grooves formed therein, and the other member having a soft-rubber surface for cooperating therewith, the grooved rigid surface and the soft-rubber surface being constrained to have relative rotation in the normal operation of the assembly.

2. The combination of a shaft member and a bearing member therefor, one of said members having a rigid bearing surface interrupted by lubricant grooves formed therein, and the other member having an unbroken, cylindrical, soft-rubber surface for cooperating therewith, the grooved rigid surface and the soft-rubber surface being constrained to have relative rotation in the normal operation of the assembly.

3. The combination of a shaft member and a bearing member therefor, one of said members having a rigid bearing surface interrupted by lubricant grooves formed therein, and the other member being provided with a removable rigid sleeve, said sleeve having a soft-rubber bearing surface for cooperating with the rigid bearing surface, and the grooved rigid surface and the soft-rubber surface being constrained to have relative rotation in the normal operation of the assembly.

4. The combination of a shaft member and a bearing member therefor, one of said members having a rigid bearing surface interrupted by lubricant grooves, and the other member having a soft-rubber surface for cooperation therewith, the surfaces defining said grooves being formed to meet the soft-rubber surface at an acute angle, and the grooved rigid surface and the soft-rubber surface being constrained to have relative rotation in the normal operation of the assembly.

5. The combination of a shaft and a bearing therefor, the journal portion of the shaft being of soft-rubber composition having a smooth unbroken bearing face, and the bearing being formed of rigid material and comprising arcuate bearing surfaces separated by longitudinal lubricant grooves, the soft-rubber member and the rigid member being constrained to have relative rotation in the normal operation of the assembly.

6. The combination of a shaft and a bearing therefor, said shaft being provided with a removable journal having a soft-rubber bearing face, and the bearing being formed of rigid material and comprising arcuate bearing surfaces separated by longitudinal lubricant grooves, the soft-rubber member and the rigid member being constrained to have relative rotation in the normal operation of the assembly.

7. The combination of a shaft and a bearing therefor, the journal portion of the shaft being of soft-rubber composition having a smooth bearing face, and the bearing being formed of rigid material and comprising arcuate bearing surfaces separated by longitudinal lubricant grooves, the surfaces defining the grooves meeting the journal surface at an acute angle, and the soft-rubber member and the rigid member being constrained to have relative rotation in the normal operation of the assembly.

8. The combination of a shaft and a bearing therefor, said shaft being provided with a removable journal comprising a metallic sleeve and vulcanized thereto a smooth-surfaced layer of soft-rubber, and said bearing being formed of rigid material formed to provide a plurality of arcuate bearing lands separated by longitudinal lubricant grooves, the soft-rubber member and the rigid member being constrained to have relative rotation in the normal operation of the assembly.

9. The combination of a journal and a bearing therefor, said journal having a smooth surface of soft-rubber composition, and said bearing being formed of rigid material to provide a plurality of arcuate bearing lands separated by lubricant grooves, the soft-rubber member and the rigid member being constrained to have relative rotation in the normal operation of the assembly.

10. The combination of a journal and a bearing therefor, said journal having a smooth surface of soft-rubber composition, and said bearing being formed of rigid material to provide a plurality of arcuate bearing lands separated by lubricant grooves, the margins of the lands meeting the surface of the journal at an acute angle, and the soft-rubber member and the rigid member being constrained to have relative rotation in the normal operation of the assembly.

11. The combination of a shaft and a bearing therefor, the journal portion of the shaft being of rigid material and comprising arcuate bearing surfaces separated by longitudinal lubricant grooves, and the bearing being formed of soft-rubber composition, the rigid member and the soft-rubber member being constrained to have relative rotation in the normal operation of the assembly.

12. The combination of a shaft and a bearing therefor, the journal portion of the shaft being of rigid material and comprising arcuate bearing surfaces separated by longitudinal lubricant grooves, and the bearing comprising a removable rigid sleeve having a bearing face formed of soft-rubber composition, the rigid member and the soft-rubber member being constrained to have relative rotation in the normal operation of the assembly.

13. The combination of a shaft and a bearing therefor, the journal portion of the shaft being of soft-rubber composition, and the bearing being formed of rigid material and comprising arcuate bearing surfaces separated by longitudinal lubricant grooves, the soft-rubber and the rigid member being constrained to have relative rotation in the normal operation of the assembly.

14. The combination of a journal and a bearing therefor, said journal having a bearing surface of soft-rubber composition, and said bearing being formed of metal to provide a plurality of arcuate bearing lands separated by lubricant grooves, the soft-rubber member and the metal member being constrained to have relative rotation in the normal operation of the assembly.

LUCIAN Q. MOFFITT.

CERTIFICATE OF CORRECTION.

Patent No. 2,004,506.　　　　　　　　　　　　　　　　　　　June 11, 1935.

LUCIAN Q. MOFFITT.

It is hereby certified that error appears in the printed specification of the above numbered patent requiring correction as follows: Page 2, second column, line 56, claim 13, after "soft-rubber" insert member; and that the said Letters Patent should be read with this correction therein that the same may conform to the record of the case in the Patent Office.

Signed and sealed this 8th day of December, A. D. 1936.

Henry Van Arsdale
(Seal)　　　　　　　　　　　　　　　　　Acting Commissioner of Patents.